UNITED STATES PATENT OFFICE.

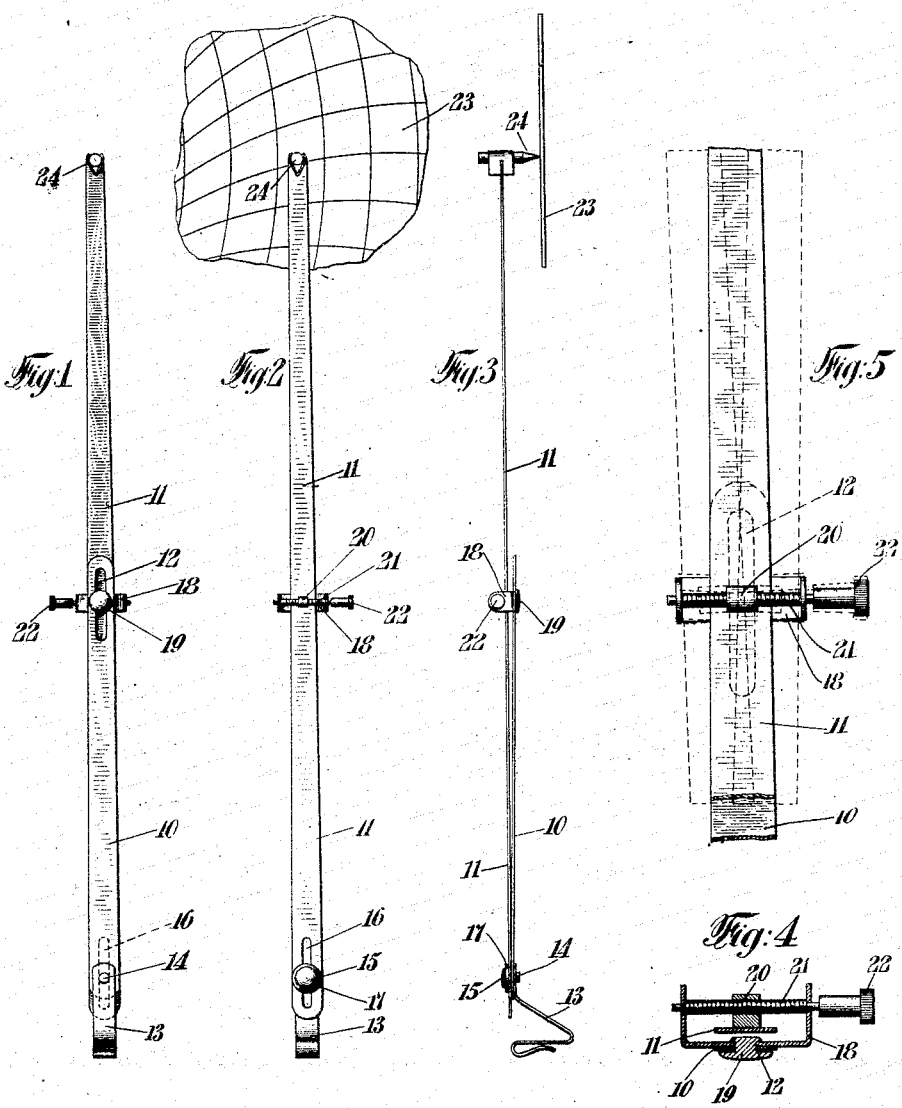

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

MEASURING INSTRUMENT.

1,136,648.　　　　Specification of Letters Patent.　　Patented Apr. 20, 1915.

Application filed September 8, 1914.　Serial No. 860,772.

*To all whom it may concern:*

Be it known that I, WILLIAM H. BRISTOL, a citizen of the United States, and a resident of Waterbury, in the county of New Haven and State of Connecticut, have invented certain new and useful Improvements in Measuring Instruments, of which the following is a specification.

The invention relates to measuring instruments of the recording type, and more particularly to the recording arm or pointer which is employed to retain the marking means adapted to move over the face of the chart of the instrument.

It has for its object to provide a recording arm or pointer which shall be resilient throughout its length in a direction at right angles to its movement, in order to admit, without disturbing the adjustment of the said arm, of the ready insertion or removal of the chart upon which the record is to be made.

The invention has for a further object to enable the said arm to be conveniently adjusted, not only in its initial setting but also for a variation in the zero position after the instrument has been placed in service.

The nature of the invention will be best understood when described in connection with the accompanying drawings, in which—

Figure 1 is a rear elevation of the improved recording arm. Fig. 2 is a front elevation thereof and of a portion of the chart. Fig. 3 is a side elevation of the recording arm and portion of the chart. Fig. 4 is a detail transverse cross-section through adjusting means employed in connection with the arm. Fig. 5 is an enlarged detail of a portion of the arm and indicates, in dotted lines, the possible variations of the position of the arm.

Similar characters of reference designate corresponding parts throughout the several views.

Referring to the drawings, 10 designates a resilient support in the nature of a thin strip of suitable metal and extends approximately half way along a resilient arm or pointer proper 11 similarly constituted. The upper end of support 10 is provided with a suitable slot 12; and at its lower end it is attached to a member 13 by which the recording member as a whole is secured in well-known manner to the actuating mechanism (not shown) for said recording member. A pin 14 of a rivet 15 passes through the support 10 and through the arm 11 and attaching member 13; and, in initially setting the instrument, support 10 may swing about the said pin 14 as an axis until the proper angular position is obtained. It is then fixedly secured in this position, with respect to the piece 13, as by soldering it thereto and to the pin 14 or by attaching it in any other convenient manner thereto. Moreover, the lower end of arm 11 is provided with a slot 16 through which the pin 14 passes, a washer 17 being interposed between the arm 11 and the head of the rivet 15. This permits of a radial adjustment of the recording arm; and, when the proper position is obtained, arm 11 is fixedly secured to the washer 17, as by soldering it thereto, to positively insure the radial position of the marking point 24 carried by the outer end of the arm 11. Arm 11 thus remains free to move relatively to support 10 about pin 14 as an axis, and its movement is controlled as follows—

Movably secured to the upper end of support 10 is a slide or U-shape piece 18 which is held in the said slot 12 by means of a rivet 19, the base of the slide piece being mounted between upper face of support 10 and the under face of the arm 11. The sides of said U-shape piece 18 embrace the arm 11 and are removed the necessary distance from the edges thereof to afford the desired degree of adjustment of said arm. To effect this adjustment, there is fixed to the upper surface of arm 11 a threaded block or the like 20 through which passes a screw 21 guided in the side walls of the slide 18 and provided at one end with a suitable head 22 by which the screw may be rotated. In thus rotating the screw 21 by rotating its head 22, arm 11 is caused to move angularly relatively to its support 10 and about the pin 14 as an axis, as indicated in the dotted lines shown in Fig. 5. A suitable adjustment is thereby provided for the said arm 11, after the instrument has been initially set, and which adjustment will be preserved during the insertion and removal of the chart 23 over which the marking point 24 operates. In flexing the pointer to enable a chart to be removed or inserted, rivet 19 is free to slide in its slot 12 and no undue strain is placed upon the recording member.

I claim:—

1. A recording member, comprising: attaching means; a resilient supporting member initially adjustable with respect to said attaching means; a resilient marking arm carried by said support and initially adjustable with respect thereto; and means to effect a further adjustment between said marking arm and said support.

2. A recording member, comprising: attaching means; a resilient supporting member initially angularly adjustable with respect to said attaching member; a resilient marking arm carried by said support and initially radially adjustable with respect thereto; and means to effect an angular adjustment between said marking arm and its said support.

3. A recording member, comprising: an attaching member; a resilient supporting member secured thereto and provided with a slot at its free end; a resilient marking arm provided with a slot at its inner end and pivotally attached at said end to said supporting member; and adjustable means working in the slot of said supporting member and connected with said marking arm to effect an adjustment between the same and said supporting member.

4. A recording member, comprising: an attaching member; a resilient supporting member secured thereto and provided with a slot at its free end; a resilient marking arm pivotally attached to said supporting member; and adjustable means including a sliding member secured to said supporting member and movable in the slot thereof, a threaded block fixed to said marking arm, and a rotatable screw working in said block and guided in said sliding member.

5. A recording member, comprising: an attaching member; a resilient supporting member secured thereto and provided with a slot at its free end; a resilient marking arm pivotally attached to said supporting member; and adjustable means including a sliding member secured to said supporting member between the same and said marking arm and having sides embracing the latter but removed a suitable distance therefrom, said sliding member being movable in the slot of the supporting member, a threaded block fixed to the upper surface of the marking arm, and a rotatable screw working in said block and guided in the sides of said sliding member.

6. A recording member, comprising: an attaching member; a resilient supporting member secured thereto and provided with a slot at its free end; a resilient marking arm provided with a slot at its inner end, a rivet passing therethrough and by means of which said arm is pivotally secured to said support, and a washer between the head of said rivet and the upper surface of said marking arm and to which the latter may be secured; and adjustable means including a sliding member secured to said supporting member between the same and said recording arm and having sides embracing the latter but removed a suitable distance therefrom, said sliding member being movable in the slot of the supporting member, a threaded block fixed to the upper surface of the said marking arm, and a rotatable screw working in said block and guided in the sides of said sliding member.

Signed at New York, in the county of New York, and State of New York, this 3rd day of September, A. D. 1914.

WILLIAM H. BRISTOL.

Witnesses:
FREDK. F. SCHUETZ.
LAURA E. SMITH.